(12) United States Patent
Wong

(10) Patent No.: US 8,671,322 B2
(45) Date of Patent: *Mar. 11, 2014

(54) MANAGEMENT OF ARQ DETECTION THRESHOLD IN COMMUNICATION NETWORKS

(75) Inventor: Ian C. Wong, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,756

(22) Filed: Aug. 20, 2012

(65) Prior Publication Data

US 2013/0044593 A1 Feb. 21, 2013

Related U.S. Application Data

(63) Continuation of application No. 12/192,654, filed on Aug. 15, 2008, now Pat. No. 8,250,425.

(51) Int. Cl.
*G06F 11/00* (2006.01)

(52) U.S. Cl.
USPC .......................................................... 714/749

(58) Field of Classification Search
USPC .......................................................... 714/749
See application file for complete search history.

(56) References Cited

U.S. PATENT DOCUMENTS

| 6,954,448 | B2 | 10/2005 | Farley et al. |
| 2002/0046379 | A1 | 4/2002 | Miki et al. |
| 2005/0250511 | A1 | 11/2005 | Xiao et al. |
| 2007/0258540 | A1 | 11/2007 | Ratasuk et al. |
| 2008/0014976 | A1* | 1/2008 | Fujita et al. ................... 455/513 |
| 2008/0056179 | A1 | 3/2008 | Kim et al. |
| 2008/0057994 | A1 | 3/2008 | Duan et al. |
| 2008/0095185 | A1* | 4/2008 | DiGirolamo et al. ......... 370/464 |
| 2008/0155371 | A1 | 6/2008 | Mauritz et al. |
| 2008/0170634 | A1 | 7/2008 | Kwak et al. |
| 2008/0310338 | A1 | 12/2008 | Charpenter et al. |
| 2009/0073904 | A1 | 3/2009 | Ranta-aho et al. |
| 2009/0103511 | A1* | 4/2009 | Marinier et al. .............. 370/345 |
| 2009/0274226 | A1 | 11/2009 | Mondal et al. |
| 2009/0323613 | A1 | 12/2009 | Frederiksen et al. |
| 2010/0040005 | A1 | 2/2010 | Kim et al. |
| 2010/0042887 | A1 | 2/2010 | Yamada et al. |
| 2010/0054188 | A1 | 3/2010 | Matsumoto et al. |
| 2010/0110905 | A1* | 5/2010 | An et al. ....................... 370/252 |
| 2010/0165939 | A1 | 7/2010 | Lin |
| 2010/0169724 | A1 | 7/2010 | Terry |
| 2010/0226263 | A1 | 9/2010 | Chun et al. |
| 2010/0254351 | A1 | 10/2010 | Wang et al. |
| 2011/0002278 | A1 | 1/2011 | Lindoff et al. |
| 2011/0041027 | A1 | 2/2011 | Fong et al. |
| 2011/0090859 | A1 | 4/2011 | Wakabayashi |

(Continued)

*Primary Examiner* — Bryce Bonzo
(74) *Attorney, Agent, or Firm* — Paradigm IP Law, PC; Ross L. Franks

(57) ABSTRACT

Embodiments of a system and methodology are disclosed for enabling a network to manage threshold values provided to UEs for use in decoding ACK-NAK signals. In various embodiments described herein, a base station signals an actual fixed threshold value in a semi-static manner for use by UEs to decode ACK/NAK signals. In these embodiments, the threshold value is part of a semi-static but UE-specific threshold value. This allows the base station to accommodate varying UE geometries, and optimize power savings for ACK-NAK transmissions. Embodiments of the invention also allow the base station to enforce a desired quality of service (QoS) without excessive power variations across ACK/NAK which are limited by the transmit power dynamic range.

22 Claims, 9 Drawing Sheets

(56) References Cited

U.S. PATENT DOCUMENTS

| | | |
|---|---|---|
| 2011/0096783 A1 | 4/2011 | Cai et al. |
| 2011/0280328 A1 | 11/2011 | Ahn et al. |
| 2011/0321112 A1 | 12/2011 | Nagy et al. |
| 2012/0071193 A1 | 3/2012 | Bhushan et al. |
| 2012/0275434 A1 * | 11/2012 | Ode et al. ............. 370/331 |

* cited by examiner

| THRESHOLD | SINR (dB) REQUIRED FOR P(ACK->NAK)=0.001 | SINR (dB) REQUIRED FOR P(ACK->NAK)=0.01 | Ave. POWER REQUIRED* | ACK/NAK DYNAMIC RANGE (dB) | POWER SAVINGS (db) VERUS 0 THRESHOLD |
|---|---|---|---|---|---|
| 0 | 2.2 | -1.4 | 1.95 | 3.6 | - |
| 0.1 | 1.1 | -0.4 | 0.97 | 1.5 | 1 |
| 0.15 | 0.6 | 0.2 | 0.56 | 0.4 | 1.4 |
| 0.20 | 0.2 | 0.6 | 0.24 | 0.4 | 1.7 |
| 0.25 | -0.5 | 1 | -0.32 | 1.5 | 2.3 |
| 0.30 | -1.2 | 1.4 | -0.86 | 2.6 | 2.8 |

*ASSUMING CINR = 0dB AND P(ACK)=0.9 AND P(NAK)=0.1

FIG. 8

| USER 1 @ 0 dB CINR | USER 2 @ -5 dB CINR | THRESHOLD = 0 | | | THRESHOLD = 0.2 | | | THRESHOLD = 0.3 | | |
|---|---|---|---|---|---|---|---|---|---|---|
| | | USER 1 POWER (dB) | USER 2 POWER (dB) | DR (dB) | USER 1 POWER (dB) | USER 2 POWER (dB) | DR (dB) | USER 1 POWER (dB) | USER 2 POWER (dB) | DR (dB) |
| ACK | ACK | 2.2 | 7.2 | 5 | 0.2 | 5.2 | 5 | -1.2 | 3.8 | 5 |
| ACK | NAK | 2.2 | 3.6 | 1.4 | 0.2 | 5.6 | 5.4 | -1.2 | 6.4 | 7.6 |
| NAK | ACK | -1.4 | 7.2 | 8.6 | 0.6 | 5.2 | 4.6 | 1.4 | 3.8 | 2.4 |
| NAK | NAK | -1.4 | 3.6 | 5 | 0.6 | 5.6 | 5 | 1.4 | 6.4 | 5 |

FIG. 9

MANAGEMENT OF ARQ DETECTION THRESHOLD IN COMMUNICATION NETWORKS

PRIORITY

This application is a continuation of and claims priority to co-owned U.S. patent application Ser. No. 12/192,654 of the same title filed Aug. 15, 2008 (issuing as U.S. Pat. No. 8,250,425), the foregoing incorporated herein by reference in its entirety.

BACKGROUND OF THE INVENTION

1. Field of the Invention

The present invention is directed in general to the field of information processing. In one aspect, the present invention relates to a system and method for managing automatic retransmission request signals in communication networks.

2. Description of the Related Art

Wireless communication systems transmit and receive signals within a designated electromagnetic frequency spectrum, but capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. Such wireless communication systems are increasingly used to distribute or "broadcast" audio and/or video signals (programs) to a number of recipients ("listeners" or "viewers") that belong to a large group. An example of such a wireless system is the 3GPP LTE (Long Term Evolution) system depicted in FIG. 1, which schematically illustrates the architecture of an LTE wireless communication system 100. As depicted, the broadcast server 102 communicates through an EPC 104 (Evolved Packet Core) which is connected to one or more access gateways (AGW) 106, 108 that control transceiver devices, 110, 112, 114, 116 which communicate with the end user devices 118, 120, 122, 124, 126, 128. In the LTE architecture, the transceiver devices 110, 112, 114, 116 may be implemented with base transceiver stations (referred to as enhanced Node-B or eNB devices) which in turn are coupled to Radio Network Controllers or access gateway (AGW) devices 106, 108 which make up the UMTS radio access network (collectively referred to as the UMTS Terrestrial Radio Access Network (UTRAN)). Each transceiver device 110, 112, 114, 116 includes transmit and receive circuitry that is used to communicate directly with any mobile end user(s) 118, 120, 122, 124, 126, 128 located in each transceiver device's respective cell region. Thus, transceiver device 110 includes a cell region 120 having one or more sectors in which one or more mobile end users 124, 126 are located. Similarly, transceiver device 112 includes a cell region 132 having one or more sectors in which one or more mobile end users 128 are located, transceiver device 114 includes a cell region 134 having one or more sectors in which one or more mobile end users 118, 120 are located, and transceiver device 116 includes a cell region 136 having one or more sectors in which one or more mobile end users 122 are located. With the LTE architecture, the eNBs 110, 112, 114, 116 are connected by an S1 interface to the EPC 104, where the S1 interface supports a many-to-many relation between AGWs 106, 108 and the eNBs 110, 112, 114, 116.

As will be appreciated, each transceiver device, e.g., eNB 110, in the wireless communication system 100 includes a transmit antenna array and communicates with receiver device, e.g., user equipment (UE) 128, having a receive antenna array, where each antenna array includes one or more antennas. The wireless communication system 100 may be any type of wireless communication system, including but not limited to a MIMO system, SDMA system, CDMA system, SC-FDMA system, OFDMA system, OFDM system, etc. Of course, the receiver/subscriber stations, e.g., UE 128, can also transmit signals which are received by the transmitter/base station, e.g., eNB 112. The signals communicated between transmitter 112 and user device 128 can include voice, data, electronic mail, video, and other data, voice, and video signals.

Various transmission strategies require the transmitter to have some level of knowledge concerning the channel response between the transmitter and each receiver, and are often referred to as "closed-loop" systems. An example application of closed-loop systems which exploit channel-side information at the transmitter ("CSIT") are precoding systems, such as space division multiple access (SDMA), which use closed-loop systems to improve spectrum usage efficiency by applying precoding at the transmitter to take into account the transmission channel characteristics, thereby improving data rates and link reliability. SDMA based methods have been adopted in several current emerging standards such as IEEE 802.16 and the 3rd Generation Partnership Project (3GPP) Long Term Evolution (LTE) platform. With such precoding systems, CSIT can be used with a variety of communication techniques to operate on the transmit signal before transmitting from the transmit antenna array. For example, precoding techniques can provide a multi-mode beamformer function to optimally match the input signal on one side to the channel on the other side. In situations where channel conditions can be provided to the transmitter, closed loop methods, such as MIMO precoding, can be used. Precoding techniques may be used to decouple the transmit signal into orthogonal spatial stream/beams, and additionally may be used to send more power along the beams where the channel is strong, but less or no power along the weak, thus enhancing system performance by improving data rates and link reliability. In addition to multi-stream transmission and power allocation techniques, adaptive modulation and coding (AMC) techniques can use CSIT to operate on the transmit signal before transmission on the transmit array.

With conventional closed-loop MIMO systems, full broadband channel knowledge at the transmitter may be obtained by using uplink sounding techniques (e.g., with Time Division Duplexing (TDD) systems). Alternatively, channel feedback techniques can be used with MIMO systems (e.g., with TDD or Frequency Division Duplexing (FDD) systems) to feed back channel information to the transmitter.

BRIEF DESCRIPTION OF THE DRAWINGS

The present invention may be understood, and its numerous objects, features and advantages obtained, when the following detailed description of a preferred embodiment is considered in conjunction with the following drawings, in which:

FIG. 8 is a table showing the average SINR required for fulfilling the target qualities, including the ACK-NAK dynamic range and the power savings resulting from each threshold;

FIG. 9 is a table showing power relationships for implementing a cell-specific threshold to achieve desired error rates for ACK/NAK detection;

Figure 1:
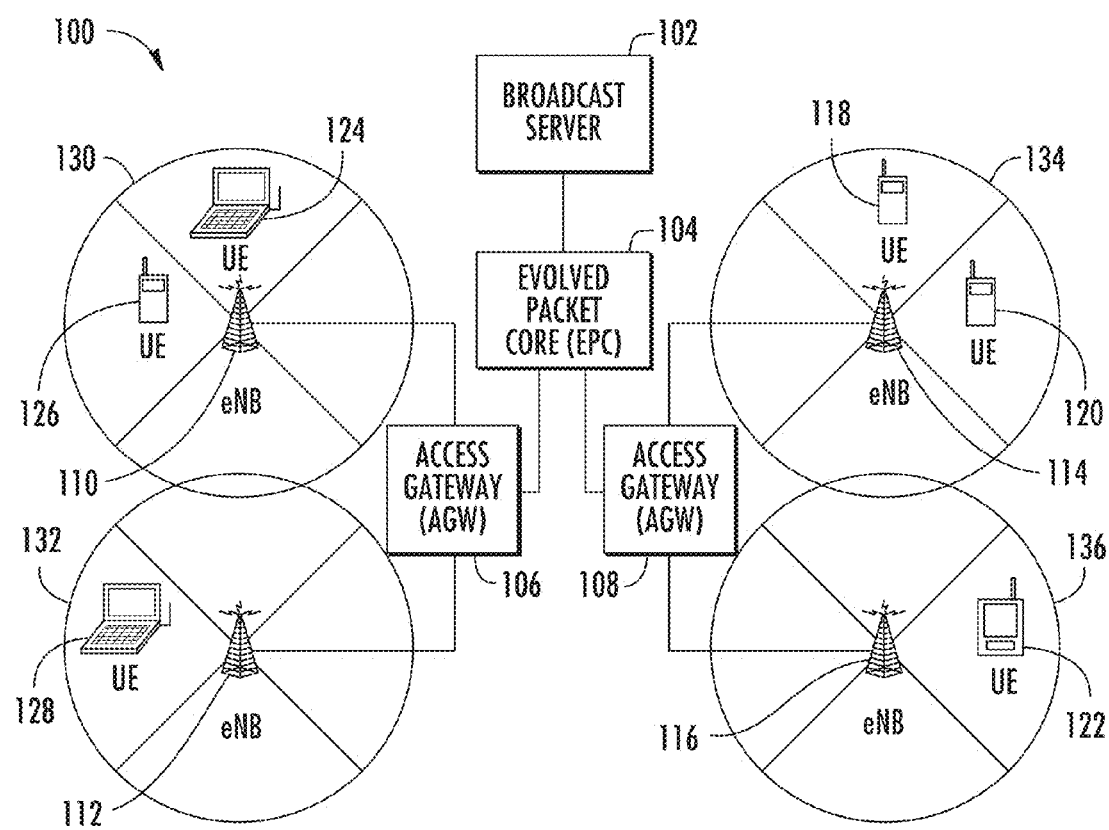
FIG. 1 schematically illustrates the architecture of an LIE wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

Embodiments of a system and methodology are disclosed for enabling a network to manage threshold values provided to UEs for use in decoding ACK-NAK signals. In the downlink of an LTE network, hybrid automatic retransmission request (HARQ) acknowledge (ACK) and not acknowledge (NAK) signals indicate to the user equipment (UE) the success or failure of an uplink transmission. It is desirable to make ACK→NAK decoding errors (i.e., erroneously decoding an ACK as a NAK) much less likely than NAK→ACK errors (i.e., erroneously decoding a NAK as an ACK). This is because an ACK→NAK decoding error causes the UE to retransmit its data on the resource which may have been already assigned by the network to another UE, thereby causing collisions and degrading overall system performance. By contrast, a NAK→ACK decoding error has an isolated impact on only the UE that made the decoding error. It would be desirable to provide systems and methods that allow the network to signal a detection threshold level to UEs in a semi-static manner. This would allow the network to provide unequal protection for a UE without excessive power boosting for ACKs, thereby ensuring consistent UE behavior, and optimizing the desired behavior across UEs according to the operator's deployment performance targets. Further limitations and disadvantages of conventional processes and technologies will become apparent to one of skill in the art after reviewing the remainder of the present application with reference to the drawings and detailed description which follow.

In various embodiments described herein, a base station signals an actual fixed threshold value in a semi-static manner for use by UEs to decode ACK/NAK signals. In these embodiments, the threshold value is part of a semi-static but UE-specific threshold value. This allows the base station to accommodate varying UE geometries, and optimize power savings for ACK-NAK transmissions. Embodiments of the invention also allow the base station to enforce a desired quality of service (QoS) without excessive power variations across ACK/NAK which are limited by the transmit power dynamic range. As used herein "semi-static" signaling refers to signaling changes transmitted on a time-scale on the order of seconds to hours and greater, compared to dynamic signaling wherein signaling changes are transmitted on a time scale of milliseconds. In general, any signaling that does not change on the order of a subframe/frame (1-10 ms) will be considered semi-static for purposes of this disclosure.

In some systems, a UE-specific threshold may require too much additional signaling overhead. Therefore, in an alternate embodiment, a network-wide threshold communicated via broadcast is implemented. In these embodiments, the base station is operable to customize the threshold in a semi-static manner across the cell and accommodate varying deployment scenarios. The actual signaling is implemented in a quantized manner where representative threshold values are chosen to optimize typical network deployments.

Various illustrative embodiments will now be described in detail with reference to the accompanying figures. While various details are set forth in the following description, it will be appreciated that the embodiments of the invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures. While the discussion will sometimes make reference to MIMO communications systems, the embodiments disclosed herein can be implemented in a wide variety of communications systems and the discussion of MIMO systems is by way of example. The embodiments disclosed herein are not intended to be limited to MIMO systems.

Figure 2:
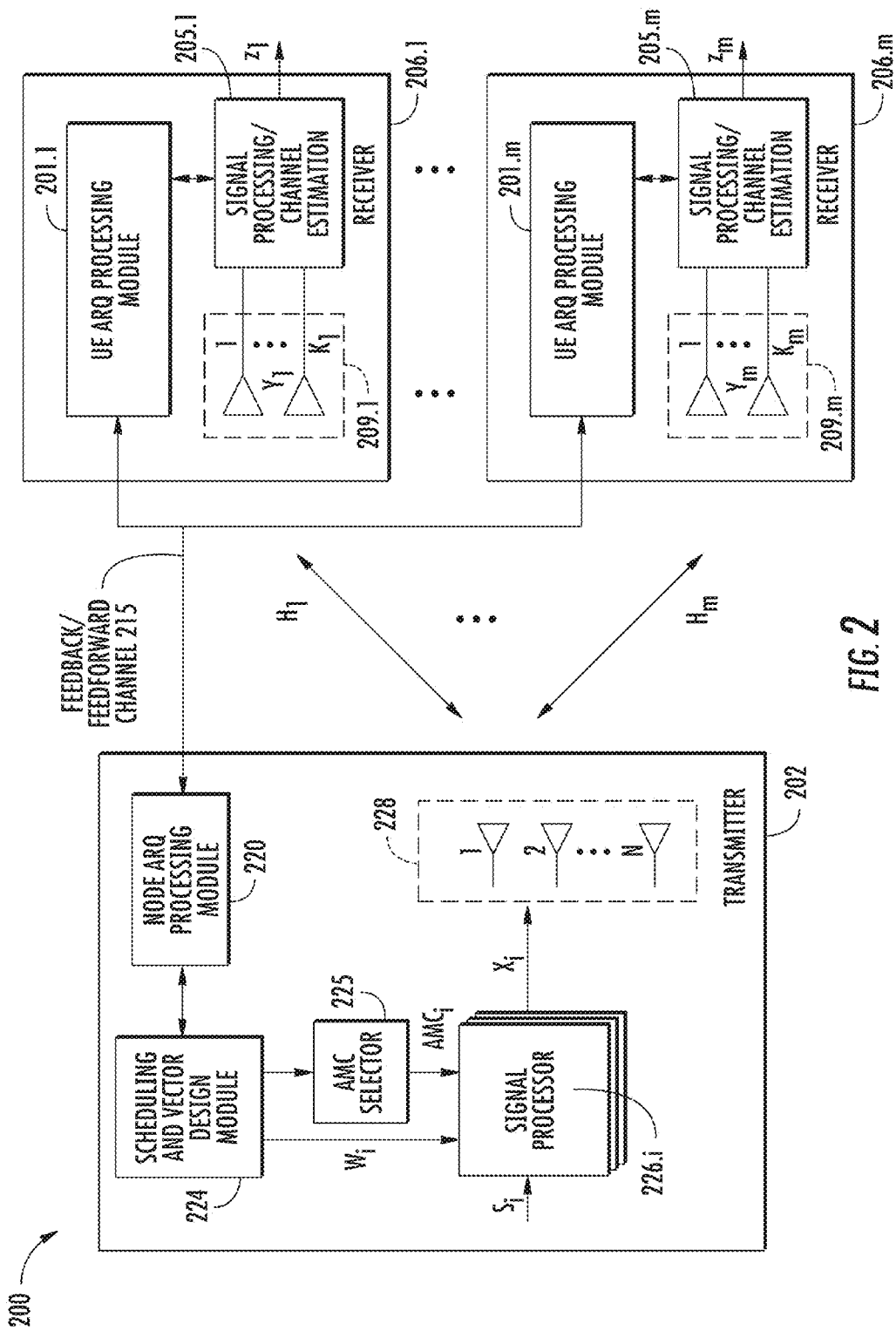
FIG. 2 depicts a wireless communication system in which automatic retransmission requests (ARQs) are managed in accordance with embodiments of the invention.

FIG. 2 depicts a wireless communication system 200 in which a transmitter station 202 communicates with one or more receiver stations 206.i. With reference to the LIE wireless system depicted in FIG. 1, the transmitter 202 may represent any of the control transceiver devices, 110, 112, 114, 116 which act as a base station, while the receiver 206.i may represent any of the end user devices 10-15. In the system 200 depicted in FIG. 2, one or more receiver stations 206.i feed back channel ARQ information over a feedback channel 215 to a transmitter station 202 for use in scheduling or otherwise precoding signal transmissions by the transmitter station 202. As will be discussed in greater detail hereinbelow, each receiver station 206.*i* monitors its channel conditions and reports on a predetermined channel (such as a physical LTE feedback channel that supports channel reporting) when there has been an important change in the channel conditions. Information regarding channel conditions, e.g., channel quality indicators (CQI), is used to configure or adapt one or more input signals that are transmitted from a transmitter 202 (e.g., a base station) to one or more receivers 206.1.-*m* (e.g., subscriber stations).

As will be appreciated, the transmitter station 202 and/or receiver stations 206.*i* include a processor, software executed by the processor, and other hardware that allow the processes used for communication and any other functions performed by the transmitter station 202 and each of receiver stations 206.*i*. It will also be appreciated that the transmitter station 202 can both transmit signals (over the downlink path) and receive signals (over the uplink path), and that each receiver station 204.*i* can receive signals (over the downlink path) and transmit signals (over the uplink path).

The transmitter 202 includes an array 228 of one or more antennas for communicating with the receivers 206.1 through 206.*m*, each of which includes an array 209.*i* having one or more antennas for communicating with the transmitter 202. In operation, a data signal $s_i$ presented at the transmitter 202 for transmission to the receiver 204.*i* is transformed by the signal processor 226.*i* into a transmission signal, represented by the vector $x_i$. The signals transmitted from the transmit antenna 228 propagate through a matrix channel $H_i$ and are received by the receive antennas 209.*i* where they are represented by the vector $y_i$. For a MIMO channel from the transmitter 202 to the $i^{th}$ receiver 206.*i*, the channel is denoted by $H_i$, i∈{1, 2, ..., m}. The channel matrix $H_i$ may be represented as a $k_i \times N$ matrix of complex entries representing the complex coefficients of the transmission channel between each transmit-receive antenna pair, where N represents the number of transmit antennas in the transmit antenna array 228, and $k_i$ represents the number of antennas of the $i^{th}$ receiver 206.*i*. At the receiver 206.*i*, the signal processing unit 205.*i* processes the $y_i$ signals received on the k antennas to obtain a data signal, $z_i$ which is an estimate of the transmitted data $s_i$. The processing of the received $y_i$ signals may include combining the $y_i$ signals with appropriate combining vector information $v_i$ retrieved from the codebook 207.*i* or otherwise computed by the receiver's signal processing unit 205.*i*.

Precoding for downlink transmissions (transmitter to receiver) may be implemented by having each receiver 206.*i* determine its MIMO channel matrix $H_i$—which specifies the profile of the transmission channel between a transmitter and an $i^{th}$ receiver—in the channel estimation signal processing unit 205.*i*. For example, in a MIMO implementation, each receiver 206.1-*m* determines its MIMO channel matrix $H_i$ by using pilot estimation or sounding techniques to determine or estimate the coefficients of the channel matrix $H_i$. Each receiver 206.*i* uses the estimated MIMO channel matrix or other channel-related information (which can be channel coefficients or channel statistics or their functions, such as a precoder, a beamforming vector or a modulation order) to generate precoding information, such as precoding and power allocation values, appropriate for the MIMO channel matrix. In addition, each receiver 206.*i* uses the estimated MIMO channel matrix or other channel-related information to configure/adapt the signals transmitted by the transmitter.

Processing of ACK/NAK signals in the system 200 is handled by a Node ARQ processing module 220 in the transmitter 202 and by UE ARQ processing modules 201 in the receivers 206.*i*. In various embodiments of the invention, the transmitter signals an actual fixed threshold value that is used in a semi-static manner. In one embodiment, the fixed threshold value is signaled as part of a semi-static, but UE-specific value. For example, the threshold may be signaled as part of a semi-static but UE-specific higher layer message. For example, the ACK/NAK signals are typically transmitted over a PHICH channel, while the user-specific message can be transmitted over a radio resource control (RRC) channel. This allows transmitter 202 to accommodate varying UE geometries, and optimize on the power savings for ACK/NAK transmissions. This also allows the transmitter 202 to enforce the desired QoS without excessive power variations in ACK/NAK signaling which are limited by transmit power dynamic range. Since a UE-specific threshold sometimes may require too much additional signaling overhead, a network-wide threshold communicated via broadcast can also be used as a compromise. In this embodiment, the transmitter 202 can still customize the threshold in a semi-static manner across the cell and accommodate varying deployment scenarios. The actual signaling can be done in a quantized manner where representative threshold values are chosen to be optimized to typical network deployments.

Embodiments of the invention can be understood by considering a single-user physical hybrid indicator channel (PHICH) transmission. The received signal can be expressed as a transmitted BPSK symbol multiplied by a complex channel with noise, i.e.

$$y = hx + n, x \in \{\sqrt{E_b^{ACK}} e^{j\pi/4}, \sqrt{E_b^{NAK}} e^{-j3\pi/4}\}$$

where $E_b^{ACK}$ and $E_b^{NAK}$ are the ACK and NAK transmit energies, respectively. The above-referenced equation can also be used for a multi-user PHICH transmission in a single group assuming perfect channel estimation.

The detected symbol can be expressed as:

$$\hat{x} = \frac{h^H y}{\|h\|^2} = x + \frac{h^H n}{\|h\|^2}$$

Given h, and with n~CN(0, $N_0$I) a complex Gaussian vector, the detected symbol has distribution $$\hat{x} \sim CN\left(x, \frac{N_0}{\|h\|^2} I\right)$$

Figure 3:
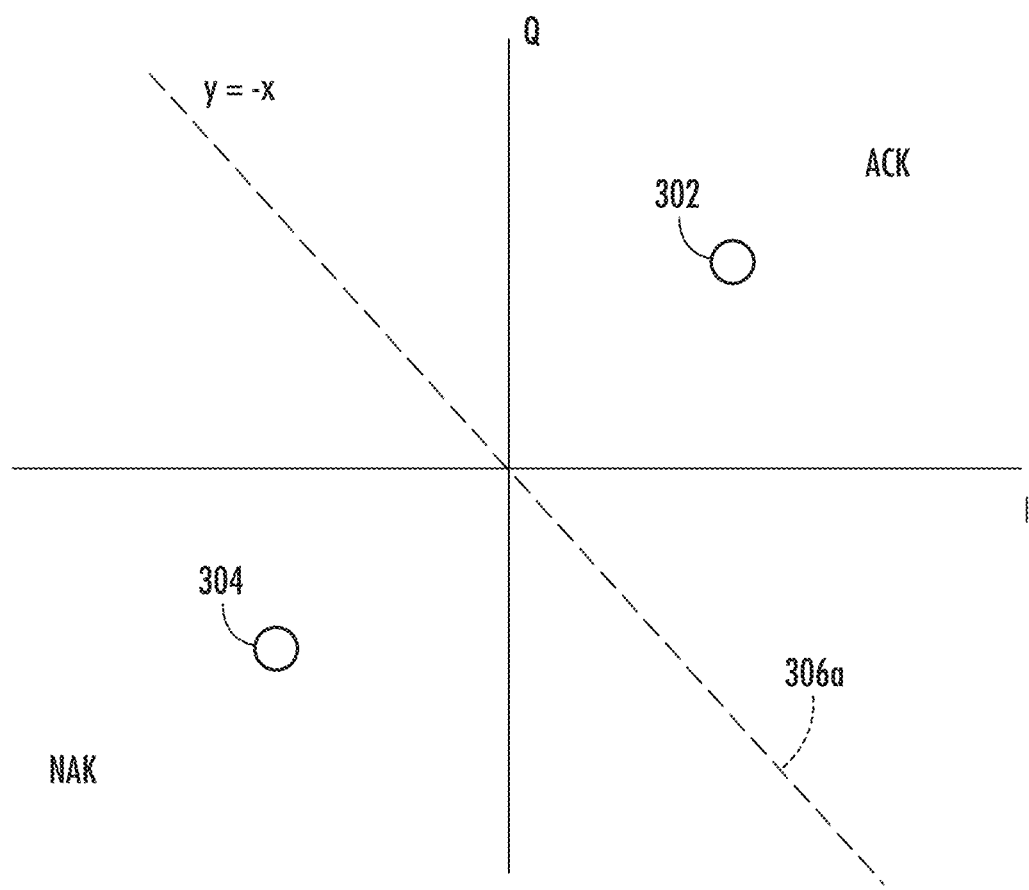
FIG. 3 illustrates a detection methodology wherein ACK and NAK signals are allocated asymmetrical detection regions in accordance with embodiments of the invention.

Using a "zero-threshold" demodulation method, the final ACK-NAK and NAK-ACK error probabilities are controlled by the power allocation of the eNB. FIG. 3 shows the decision region for ACK and NAK using the zero-threshold assumption.

The hybrid ARQ indicator (HI) demodulation decision can be expressed as:

$$HI = \begin{cases} 0, & \text{Im}\{\hat{x}\} \geq -\text{Re}\{\hat{x}\} \\ 1, & \text{Im}\{\hat{x}\} < -\text{Re}\{\hat{x}\} \end{cases}$$

As an example of zero threshold detection FIG. 3 shows a BPSK constellation comprising an ACK signal 302 and a NAK signal 304. In this example, an unambiguous threshold is specified as "x dB," where x is defined by the ratio of detection region allocated to an ACK compared to the region allocated to a NAK in the BPSK constellation. The region allocated for detection of an ACK is equal to the region allocated for detection of a NACK, as illustrated by reference 306*a*.

Figure 4:
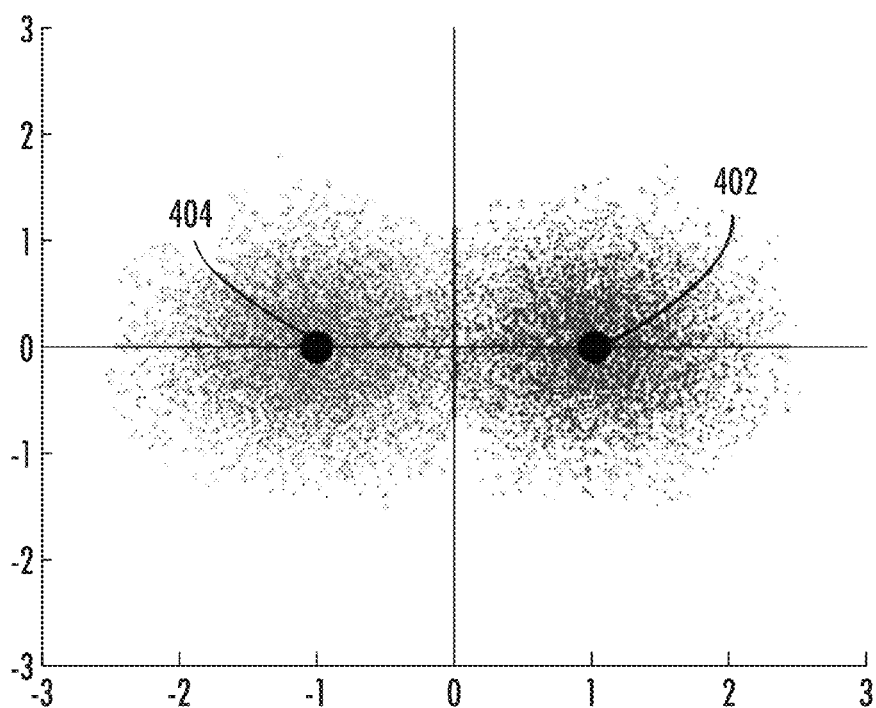
FIG. 4 illustrates a constellation of ACK/NAK signals.

The analysis can be simplified by rotating the received signal by $-\pi/4$ and considering only the real axis, yielding an expression of the new detected symbol as shown in FIG. 4 with a constellation comprising an ACK 402 and a NAK 404. In this example, the expression of the detected signals is expressed as:

$$\hat{s} = \text{Re}\{\hat{x}e^{-j\pi/4}\} \sim N\left(s, \frac{1}{\gamma}I\right), s \in \left\{-\sqrt{E_b^{NAK}}, \sqrt{E_b^{ACK}}\right\}$$

where $$\gamma = \frac{2\|h\|^2}{N_0}$$

is the channel-to-interference plus noise (CINR) ratio and the new decision can be written as:

$$HI = \begin{cases} 0, \hat{s} \geq 0 \\ 1, \hat{s} < 0 \end{cases}$$

The ACK→NAK and NAK→ACK conditional error probabilities given γ can be written as $$P(ACK \rightarrow NAK|\gamma) = P(\hat{s} < 0|s = \sqrt{E_b^{ACK}}, \gamma) = Q(\sqrt{E_b^{ACK}\gamma})$$

$$P(NAK \rightarrow ACK|\gamma) = P(\hat{s} > 0|s = -\sqrt{E_b^{NAK}}, \gamma) = Q(\sqrt{E_b^{NAK}\gamma})$$

Figure 5:
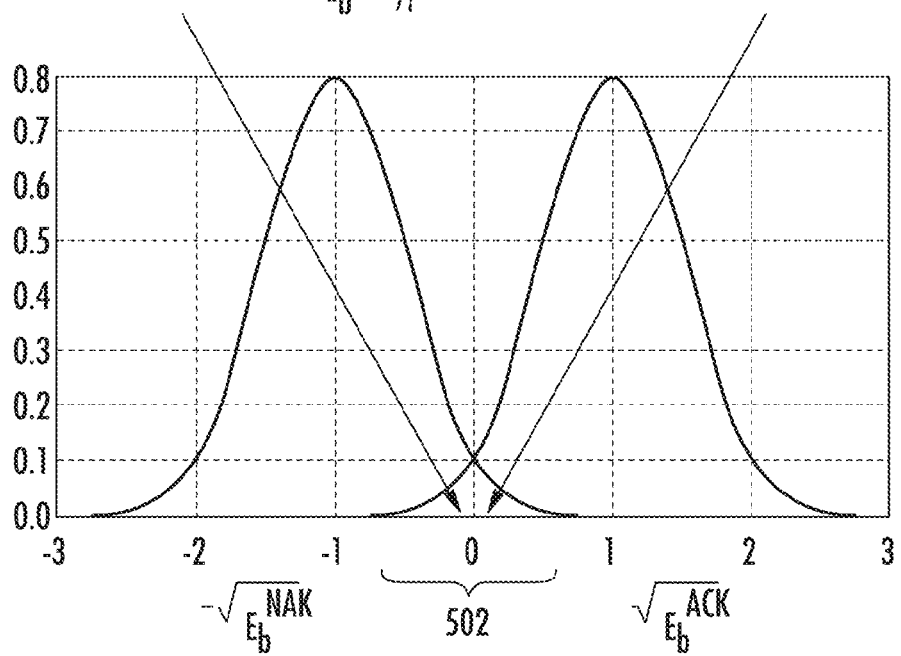
FIG. 5 is graphical illustration of conditional error probabilities in the detection of ACK/NAK signals.

The above-referenced conditional error probabilities are illustrated by the region 502 shown in FIG. 5.

Considering the target qualities of P(ACK→NAK)<0.001 and P(NAK→ACK)<0.01, the requirement can then be written as $$\int_0^\infty Q(\sqrt{E_b^{ACK}\gamma})f_\gamma(\gamma)d\gamma \leq 0.001$$

$$\int_0^\infty Q(\sqrt{E_b^{NAK}\gamma})f_\gamma(\gamma)d\gamma \leq 0.001$$

In the above equations, the target quality is managed using the power control at the eNB. Assuming that the eNB has perfect knowledge of γ and infinite dynamic range, the power control can be written as:

$$E_b^{ACK} \geq \frac{(Q^{-1}(0.001))^2}{\gamma} = \frac{9.55}{\gamma}; E_b^{NAK} \geq \frac{(Q^{-1}(0.01))^2}{\gamma} = \frac{5.41}{\gamma}$$

It is apparent that nearly twice as much power is needed for an ACK compared to a NAK to achieve the desired qualities when using zero threshold. Coupled with the fact that ACK is transmitted 90% of the time, this can result in an excessive power penalty at the eNB. Furthermore, due to dynamic range restrictions, the desired powers may not be met, especially for cell-edge users.

Alternatives to the zero threshold method bias the demodulation at the UE towards the ACK in some manner such that the unequal error protection can be achieved with less power overhead. Examples of these methods include decision-region based methods and CINR-region based methods.

Figure 6A:
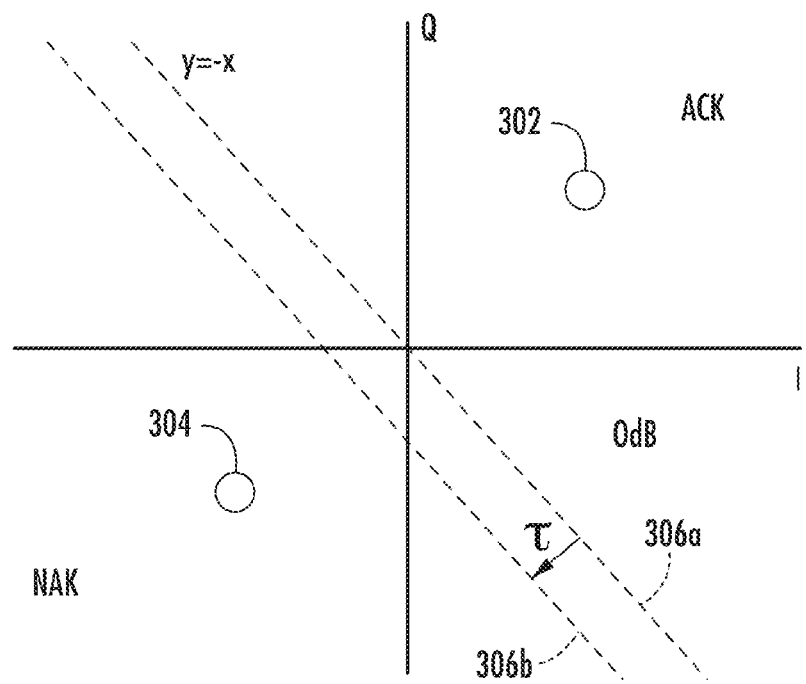
FIGS. 6a-b illustrate embodiments of decision-region based methods for the detection of ACK/NACK signals.
Figure 6B:
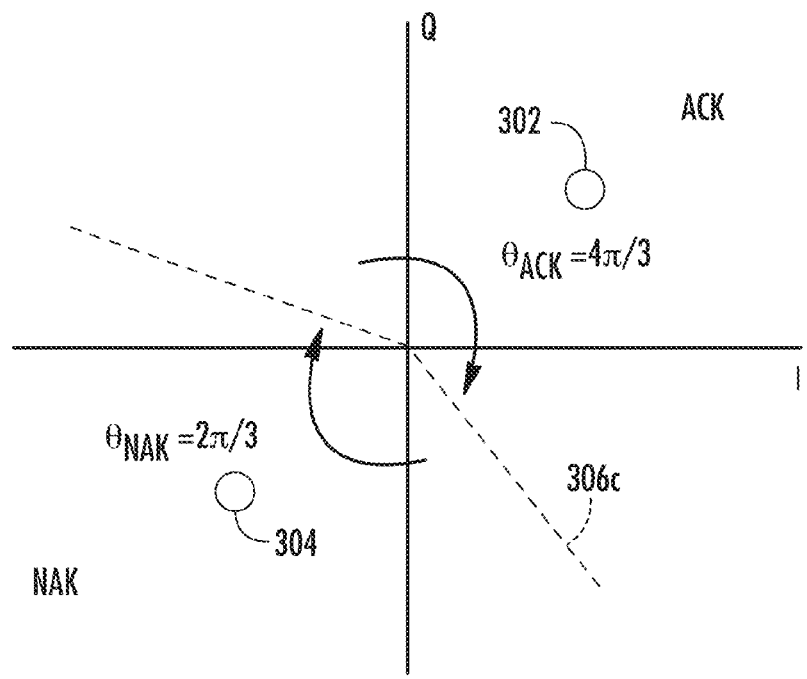

FIGS. 6*a* and 6*b* illustrate embodiments of "decision-region based" detection methods wherein a "thresholding" operation results in the expansion of the decision region for ACK and shrinking the decision region for NAK, thereby decreasing the ACK→NAK error probability and increasing the NAK→ACK error probability. In FIG. 6*a*, the axis separating the ACK detection region and the NAK detection region is shifted to the left by an increment, t, as illustrated by axis 306*b*. In an alternate embodiment shown in FIG. 6*b*, the ACK detection region is expanded by "bending" the axis separating the detection regions as illustrated by axis 306*c*.

The above-referenced methods are alternative methods for providing unequal detection probability regions. Using the same approach as for the zero-threshold case, the power control equations for the two error targets can be written as $$E_b^{ACK} \geq \frac{(Q^{-1}(0.001) + \sqrt{\gamma}\tau)^2}{\gamma}$$

$$E_b^{NAK} \geq \frac{(Q^{-1}(0.01) - \sqrt{\gamma}\tau)^2}{\gamma}$$

Since the threshold value τ is negative, it is apparent that the required power boost for ACK versus NAK can be decreased, thereby decreasing the average power required to fulfill the necessary quality targets.

In an alternative embodiment, implementing a CINR threshold to decode the signal as ACK, the total error probabilities can then be written as:

$$P(ACK \rightarrow NAK) = \int_{\gamma_{th}}^\infty Q(\sqrt{E_b^{ACK}}\gamma)f_\gamma(\gamma)d\gamma \leq 0.001$$

$$P(NAK \rightarrow ACK) = P(\gamma < \gamma_{th}) + \int_{\gamma_{th}}^\infty Q(\sqrt{E_b^{NAK}}\gamma)f_\gamma(\gamma)d\gamma \leq 0.001$$

In an embodiment of the invention, a power control methodology is implemented in accordance with the following mathematical relationships:

$$E_b^{ACK} \geq \frac{\left[Q^{-1}\left(\frac{0.001}{P(\gamma \geq \gamma_{th})}\right)\right]^2}{\gamma}$$

$$E_b^{NAK} \geq \frac{\left[Q^{-1}\left(\frac{0.01 - P(\gamma < \gamma_{th})}{P(\gamma \geq \gamma_{th})}\right)\right]^2}{\gamma}$$

Using the non-zero threshold implementations discussed above provide two equations (ACK→NAK and NAK→ACK probability requirements) in three unknowns, $E_b^{ACK}$, $E_b^{NAK}$ and a threshold constant. Therefore, if a threshold level is determined a-priori, the desired power control from the eNB can be unambiguously implemented. Similarly, if an additional equation on the power control levels is provided, it is possible to generate the "correct" threshold level to provide the desired behavior.

Figure 7:
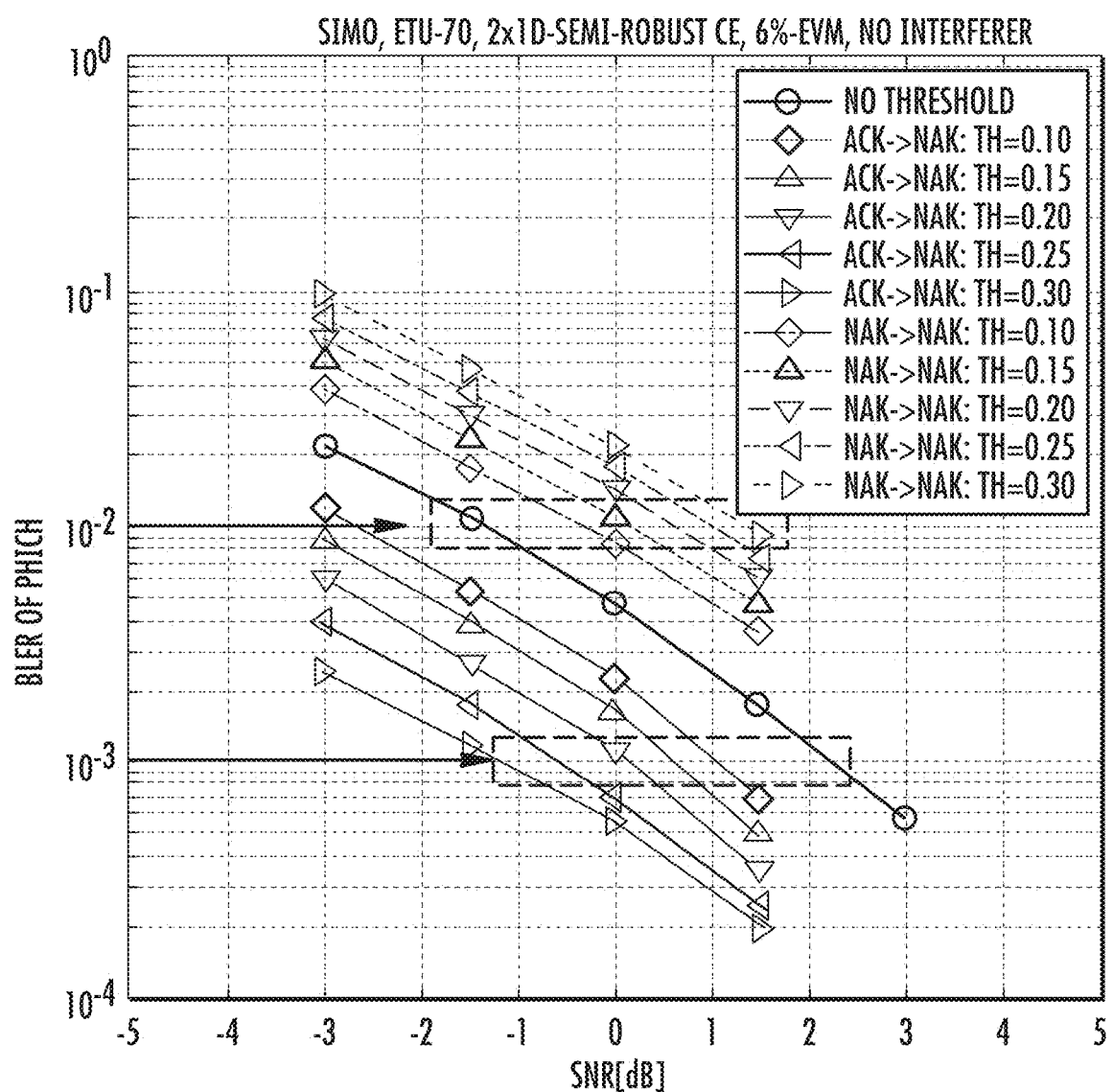
FIG. 7 is an illustration of LTE hybrid ARQ system performance for a single user at various ACK/NAK detection thresholds.

FIG. 7 is an illustration of LTE hybrid ARQ system performance for a single user at various ACK/NAK thresholds. The curves shown in FIG. 7 are based on one transmit antenna at the eNB and two receive antennas at the UE. The channel in this example is a frequency-selective channel with an extended urban power delay profile, 70 Hz of Doppler, practical channel estimation and 6% transmit EVM. As can be seen, changing the thresholds result in changes in the SINR for which the target qualities of error rates for ACK→NAK and NAK→are achieved.

FIG. 8 provides a table showing the average signal-to-interference plus noise ratio (SINR) required for fulfilling the target qualities, including the ACK-NAK dynamic range and the power savings resulting from each threshold. The average required power shown in FIG. 8 is computed assuming a CINR=0 dB and P(ACK)=0.9 and P(NAK)=0.1.

FIG. 9 provides a table showing power relationships for implementing a cell-specific threshold to achieve desired error rates for ACK/NAK detection. Depending on the cell size, the eNB may select a different threshold based on the tradeoff between power savings and dynamic range. For example, in a large cell, the required power would be much larger for a user in the cell-edge versus a user in the cell-center. The table in FIG. 9 shows an example of 2 users with a large CINR dynamic range, and the total dynamic range given various thresholds. If, for example, a maximum dynamic range of 7 dB is specified, cells 902 and 904 indicate dynamic range violations. In this example, the worst case dynamic range is calculated as: Worst-case dynamic range=CINR dynamic range across users ACK-NAK dynamic range. Thus, in this large cell case, although the Threshold=0.3 case saves more power, the eNB would use Threshold=0.2 due to violation of dynamic range constraints for threshold=0.3. Conversely, in the case of only a small cell, i.e. when CINR dynamic range across users is small, the base station may choose a higher threshold to save on power, since the dynamic range is not an issue.

Figure 10:
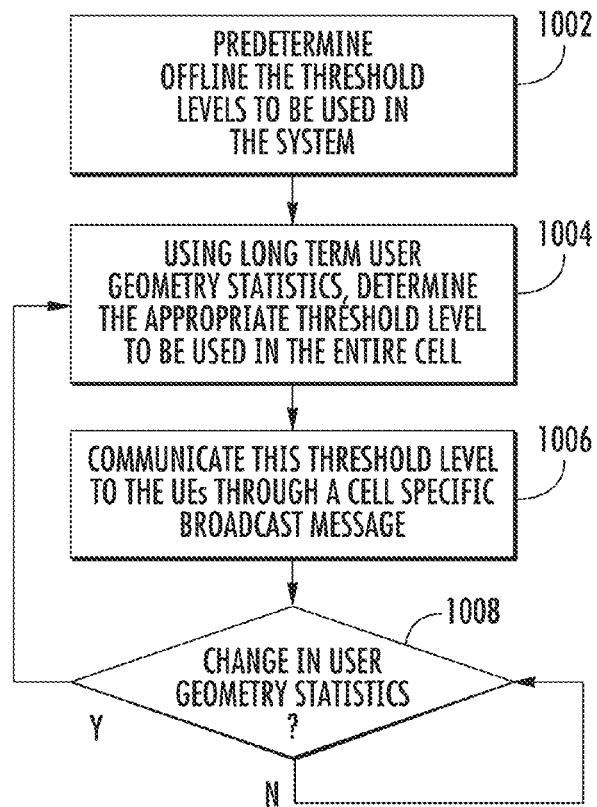
FIG. 10 is a flowchart illustration of a method for implementing embodiments of the invention using cell-specific signaling.

FIG. 10 is a flowchart illustration of a method for implementing embodiments of the invention using cell-specific signaling. In step 1002, the base station executes code in an off-line session to generate predetermined thresholds for use in a communication system. In step 1004, the base station uses long-term geometry statistics to determine the appropriate threshold to be used in the entire cell for decoding ACK/NAK signals. In step 1006, the chosen threshold is communicated to the UEs through a cell-specific broadcast message. In step 1008, a test is conducted to determine if there has been a change in user geometry statistics. If the result of the test conducted in step 1008 indicates that there has not been a change in the user geometries, the test is repeated. When the test conducted in step 1008 indicates that there has been a change in the user geometries, processing returns to step 1004 and the base station determines a new appropriate threshold to be used for decoding ACK/NAK signals in the cell. The processing in steps 1006 and 1008 are then repeated.

In some embodiments of the invention the base station is operable to assign user-specific thresholds for decoding AC/NAK signals. In view of the flexibility of assigning a user-specific threshold, the eNB can further optimize the performance tradeoff of power versus dynamic range. For example, the eNB can minimize the transmit power given dynamic range constraints. For example, assuming a threshold of 0.2, the total power required is: Total power=Power user 1+Power user 2=6.44 dB, again with the assumption that P(ACK)=0.9 and P(NAK)=0.1.

As an alternative example, it is possible to provide user 1 with threshold 0.2 but user 2 with threshold 0.3. In this example, the total power required is 5.6261 dB. The worst case dynamic range, however, is 6.4 dB–0.2 dB=6.2 dB, when user 1 is sent an ACK and user 2 is sent a NAK. Thus, it is possible to save approximately 1 dB with user-specific threshold setting without violating the dynamic range constraint. More power savings can potentially be gained for more disparate thresholds, and more disparate user geometries.

Figure 11:
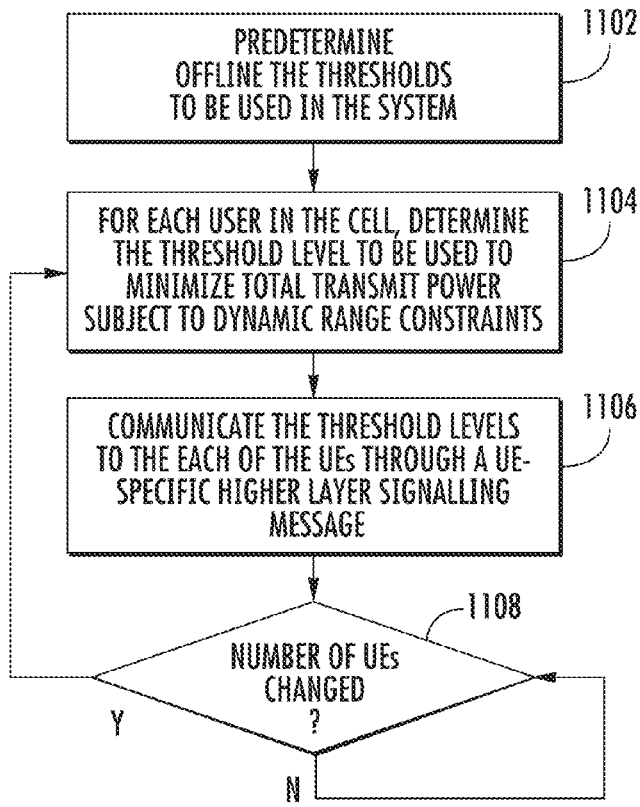
FIG. 11 is a flowchart illustration of a method for implementing embodiments of the invention using user-specific signaling.

FIG. 11 is a flowchart illustration of a method for implementing embodiments of the invention using cell-specific signaling. In step 1102, the base station executes code in an off-line session to generate predetermined thresholds for use in a communication system. In step 1104, the base station calculates the threshold to be used by each UE for decoding ACK/NAK signals, subject to dynamic range constraints. In step 1106, the chosen thresholds are communicated to each of the UEs through a UE-specific higher layer message. In step 1108, a test is conducted to determine if the number of UEs has changed. If the result of the test conducted in step 1108 indicates that there has not been a change in the number of UEs, the test is repeated. When the test conducted in step 1108 indicates that there has been a change in the number of UEs, processing returns to step 1104 and the base stations determines new appropriate thresholds to be used by each of the UEs for decoding ACK/NAK signals in the cell. The processing in steps 1106 and 1108 are then repeated.

In some embodiments of the invention, a base station signals the boosting level it intends to use, i.e.

$$\frac{E_b^{ACK}}{E_b^{NAK}} = x.$$

The UE can then use the following three equations $$E_b^{ACK} \geq \frac{\left(Q^{-1}(0.001) + \sqrt{\gamma}\,\tau\right)^2}{\gamma}$$

$$E_b^{NAK} \geq \frac{\left(Q^{-1}(0.01) - \sqrt{\gamma}\,\tau\right)^2}{\gamma}$$

$$\frac{E_b^{ACK}}{E_b^{NAK}} = x$$

to determine the correct threshold. This results in the UE fulfilling the quality targets at a given CINR $\gamma$. This can be done in either cell-specific or user-specific modes. The equations shown above are by way of example only. Since any method of non-zero threshold results in two equations (EbACK equation, EbNAK equation) having three unknowns (EbACK, EbNAK, tau), specifying one more equation, for example, the relationship between EbACK and EbNAK, i.e. the boosting level, the UE can unambiguously determine the threshold for a given CINR $\gamma$ (which can be estimated by the UE).

Figure 12:
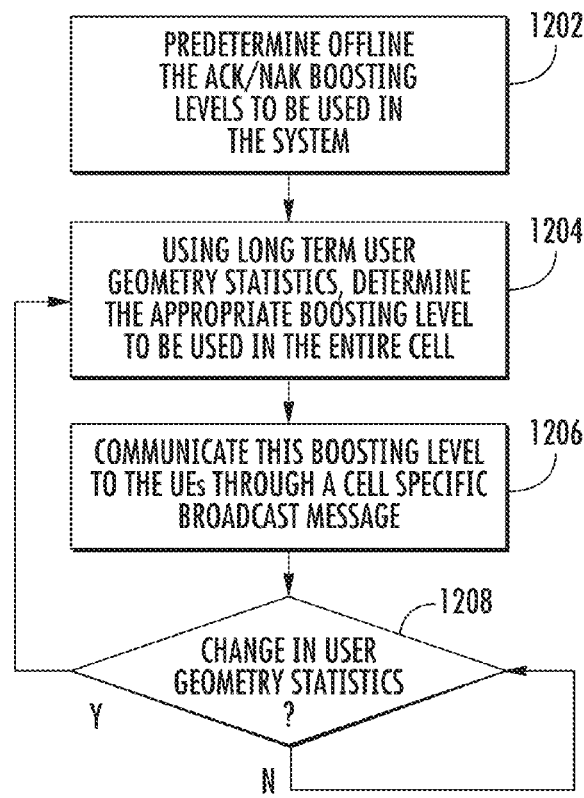
FIG. 12 is a flowchart illustration of another method for implementing embodiments of the invention using cell-specific signaling of power boosting levels.

FIG. 12 is a flowchart illustration of a method for implementing embodiments of the invention using cell-specific signaling of power boosting levels. In step 1202, the base station executes code in an off-line session to generate predetermined ACK/NAK boosting levels for use in a communication system. In step 1204, the base station uses long-term geometry statistics to determine the appropriate boosting level to be used in the entire cell for decoding ACK/NAK signals. In step 1206, the chosen boosting level is communicated to the UEs through a cell-specific broadcast message. In step 1208, a test is conducted to determine if there has been a change in user geometry statistics. If the result of the test conducted in step 1208 indicates that there has not been a change in the user geometries, the test is repeated. When the test conducted in step 1208 indicates that there has been a change in the user geometries, processing returns to step 1204 and the base station determines a new appropriate boosting level to be used for decoding ACK/NAK signals in the cell. The processing in steps 1206 and 1208 are then repeated.

Figure 13:
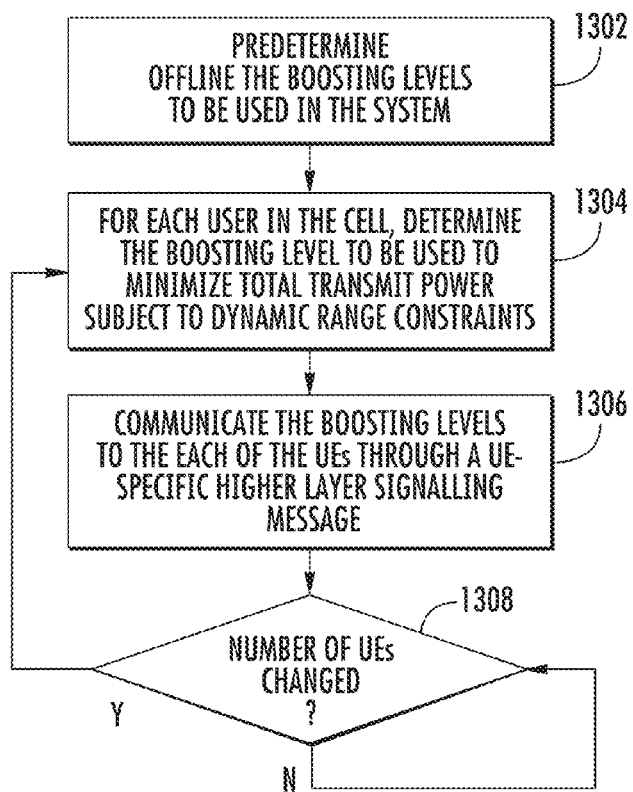
FIG. 13 is a flowchart illustration of another method for implementing embodiments of the invention using user-specific signaling.

FIG. 13 is a flowchart illustration of a method for implementing embodiments of the invention using cell-specific signaling. In step 1302, the base station executes code in an off-line session to generate predetermined boosting levels for use in decoding ACK/NAK signals in a communication system. In step 1304, the base station calculates the boosting to be used by each UE for decoding ACK/NAK signals, to minimize transmit power. In step 1306, the chosen boosting levels are communicated to each of the UEs through a UE-specific higher layer message. In step 1308, a test is conducted to determine if the number of UEs has changed. If the result of the test conducted in step 1308 indicates that there has not been a change in the number of UEs, the test is repeated. When the test conducted in step 1308 indicates that there has been a change in the number of UEs, processing returns to step 1304 and the base stations determines new appropriate boosting levels to be used by each of the UEs for decoding ACK/NAK signals in the cell. The processing in steps 1306 and 1308 are then repeated.

The methods and systems for managing thresholds for detecting ARQ signals as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, precoding the modulated signals, preconditioning the precoded signals, extracting channel rank reports from the uplink messages and so on) and/or at the receiver (e.g., recovering the transmitted signals, demodulating and decoding the recovered signals, detecting changes in the receiver state that require feedback of channel-side information and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various feedback systems and methods for using same, the present invention is not necessarily limited to the example embodiments illustrate herein. For example, various embodiments of a channel rank feedback system and methodology disclosed herein may be implemented in connection with various proprietary or wireless communication standards, such as IEEE 802.16e, 3GPP-LTE, DVB and other multi-user systems, such as wireless MIMO systems, though channel rank information can also be used in non-MIMO communication systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing signals in a mobile communications device, the method comprising:
   receiving an acknowledge/negative acknowledge (ACK/NAK) threshold level from a base station; and
   using the ACK/NAK threshold level at least in part to decode one or more received ACK/NAK signals at the mobile device.

2. The method of claim 1, wherein the ACK/NAK threshold level is defined from a predetermined set of ACK/NAK threshold levels.

3. The method of claim 1, wherein the ACK/NAK threshold level provides a detection probability for an ACK that is greater than the detection probability for a NAK.

4. The method of claim 3, wherein the ACK/NAK threshold level is specific to the mobile device.

5. The method of claim 3, wherein the ACK/NAK threshold level is specific to a cell in which the mobile device is currently in data communication.

6. The method of claim 1, wherein the receiving comprises receiving a semi-static transmission from the base station, the received ACK/NACK threshold level not changing for at least ten (10) milliseconds.

7. The method of claim 1, wherein the receiving comprises receiving the ACK/NACK threshold level over a radio resource channel (RRC).

8. A wireless device, comprising:
   a processor;
   one or more wireless interfaces in data communication with the processor; and
   logic in data communication with the processor and the one or more wireless interfaces; the logic configured to:
      receive an acknowledge/negative acknowledge (ACK/NAK) threshold level; and
      decode one or more received ACK/NAK signals based at least in part on the ACK/NAK threshold level.

9. The wireless device of claim 8, wherein the ACK/NAK threshold level is specific to the wireless device for detecting ACK/NAK signals.

10. The wireless device of claim 8, wherein the ACK/NAK threshold level is specific to a serving cell of the wireless device for detecting ACK/NAK signals.

11. The wireless device of claim 8, wherein the ACK/NAK threshold level provides a detection probability for an ACK that is greater than the detection probability for a NAK.

12. A non-transitory computer readable apparatus for use in a wireless device, the computer readable apparatus comprising a plurality of instructions configured to, when executed by a digital processor:
receive an acknowledge/negative acknowledge (ACK/NAK) threshold parameter; and
utilize the ACK/NAK threshold parameter at least in part to detect one or more ACK/NAK signals;
where the ACK/NAK threshold parameter is configured to provide a detection probability for an ACK that is greater than the detection probability for a NAK.

13. A method for processing signals by a base station, wherein the base station communicates with user equipment devices over a transmission channel, the method comprising:
determining a specific acknowledge/negative acknowledge (ACK/NAK) threshold level from a plurality of ACK/NAK threshold levels for one or more user equipment devices based at least in part on one or more operating parameters; and
transmitting the specific ACK/NAK threshold levels to the respective user equipment devices on a semi-static basis.

14. The method of claim 13, further comprising:
determining, after the act of transmitting, when a number of user equipment devices connected to the base station has changed from a previously determined number of user equipment devices; and
when the number of user equipment has changed:
determining a specific ACK/NAK threshold for at least one user equipment device; and
transmitting the specific ACK/NAK threshold level.

15. The method of claim 13, wherein the determined specific ACK/NAK threshold level is selected to provide a detection probability for an ACK that is greater than the detection probability for a NAK for the respective user equipment device.

16. The method of claim 13, wherein the specific ACK/NAK threshold level is determined based at least in part on at least one of the one or more operating parameters being specific to the respective user equipment device.

17. The method of claim 13, wherein the specific ACK/NAK thresholds levels are determined based on a respective serving cell of the user equipment devices.

18. The method of claim 13, wherein the ACK/NAK threshold levels comprise power boost levels for decoding ACK/NAK signals at the user equipment devices.

19. A base station configured to process signals in a communication system comprising one or more user equipment devices, the base station comprising:
a processor;
at least one network interface in data communication with the processor; and
logic in data communication with the processor and the at least one network interface, the logic configured to:
designate specific acknowledge/negative acknowledge (ACK/NAK) threshold parameters of a plurality of ACK/NAK threshold parameters to one or more user equipment devices; and
transmit the designated ACK/NAK threshold parameters to the one or more user equipment devices on a semi-static basis.

20. The base station of claim 19, wherein the logic is further configured to designate the specific ACK/NAK threshold parameter based at least in part on power consumption constraints.

21. The base station of claim 19, wherein the logic is further configured to designate the specified ACK/NAK threshold parameter to provide a detection probability for an ACK that is greater than the detection probability for a NAK.

22. A non-transitory computer readable apparatus for use in a base station, the computer readable apparatus comprising a plurality of instructions configured to, when executed by a digital processor:
determine specific acknowledge/negative acknowledge (ACK/NAK) parameters of a plurality of ACK/NAK parameters for one or more user equipment devices based at least in part on one or more operating parameters; and
transmit the specific ACK/NAK parameters to the one or more user equipment devices on a semi-static basis.

* * * * *